(12) United States Patent
Suzuki et al.

(10) Patent No.: US 11,373,350 B2
(45) Date of Patent: Jun. 28, 2022

(54) APPARATUS AND METHOD FOR EDITING DATA AND PROGRAM

(71) Applicant: Preferred Networks, Inc., Tokyo (JP)

(72) Inventors: Ryohei Suzuki, Tokyo (JP); Takeru Miyato, Tokyo (JP); Taizan Yonetsuji, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 43 days.

(21) Appl. No.: 16/682,047

(22) Filed: Nov. 13, 2019

(65) Prior Publication Data

US 2020/0160575 A1 May 21, 2020

(30) Foreign Application Priority Data

Nov. 15, 2018 (JP) .............................. JP2018-215020

(51) Int. Cl.
*G06T 11/60* (2006.01)
*G06N 3/08* (2006.01)
*G06N 3/04* (2006.01)
*G06T 3/40* (2006.01)

(52) U.S. Cl.
CPC ............ *G06T 11/60* (2013.01); *G06N 3/0454* (2013.01); *G06N 3/08* (2013.01); *G06T 3/4046* (2013.01)

(58) Field of Classification Search
None
See application file for complete search history.

(56) References Cited

U.S. PATENT DOCUMENTS

| | | | | |
|---|---|---|---|---|
| 2019/0138896 A1* | 5/2019 | Deng | ..................... | G06N 3/084 |
| 2019/0332850 A1* | 10/2019 | Sharma | .............. | G06K 9/00308 |
| 2019/0378242 A1* | 12/2019 | Zhang | .................. | G06K 9/6201 |
| 2020/0034565 A1* | 1/2020 | Kim | ..................... | G06K 9/6257 |
| 2021/0074046 A1* | 3/2021 | Gong | ..................... | G06K 9/34 |

OTHER PUBLICATIONS

Jun-Yan Zhu et al., Generative Visual Manipulation on the Natural Image Manifold, ECCV, 2016.
Anh Nguyen et al., Plug & Play Generative Networks: Conditional Iterative Generation of Images in Latent Space, arXiv:1612.00005, 2017.
Takeru Miyato et al., cGANs with Projection Discriminator, ICLR, 2018.
Han Zhang et al., Self-Attention Generative Adversarial Networks, arXiv:1805.08318, 2019.
Andrew Brock et al., Large Scale GAN Training for High Fidelity Natural Image Synthesis, arXiv:1809.11096, 2019.

(Continued)

*Primary Examiner* — Fan Zhang
(74) *Attorney, Agent, or Firm* — IPUSA, PLLC

(57) ABSTRACT

A flexible data editing scheme to change and modify an intermediate representation or conditional information for a portion of to-be-edited data is disclosed. One aspect of the present disclosure relates to a data editing apparatus, comprising: one or more memories; and one or more processors configured to receive a change indication to change at least a first data area of first data; generate second data by using one or more generative models and an intermediate representation for the first data area; and replace the first data area of the first data with the second data to generate third data.

20 Claims, 6 Drawing Sheets

(56) References Cited

OTHER PUBLICATIONS

Jun-Yan Zhu et al., Unpaired Image-to-Image Translation using Cycle-Consistent Adversarial Networks, arXiv:1703.10593, 2018.
Xiaodan Liang et al., Generative Semantic Manipulation with Contrasting GAN, arXiv:1708.00315, 2017.
Takuhiro Kaneko et al., Generative Attribute Controller with Conditional Filtered Generative Adversarial Networks. IEEE Conference on Computer Vision and Pattern Recognition (CVPR), 2017.
Xun Huang et al., Arbitrary Style Transfer in Real-time with Adaptive Instance Normalization, ICCV, 2017.
Iryna Korshunova et al., "Fast Face-swap Using Convolutional Neural Networks", 2017 IEEE International Conference on Computer Vision (ICCV), Jul. 27, 2017, Year: 2017, vol. 1, pp. 3697-3705.
Yuezun Li et al., "Exposing Deepfake Videos by Detecting Face Warping Artifacts", Nov. 1, 2018 arXiv: Computer Vision and Pattern Recognition.
Leon A. Gatys et al., "Controlling Perceptual Factors in Neural Style Transfer", arXiv:1611.07865v2 [cs.CV] May 11, 2017 <https://arxiv.org/pdf/1611.07865.pdf>.
Tiziano Portenier et al., "FaceShop Deep Sketch-based Face Image Editing", arXiv:1804.08972v2 [cs.CV] Jun. 7, 2018 <https://arxiv.org/pdf/1804.08972.pdf>.
Leon A. Gatys et al., "Image Style Transfer Using Convolutional Neural Networks", Proceedings of the IEEE Conference on Computer Vision and Pattern Recognition (CVPR), 2016, pp. 2414-2423 <https://web.archive.org/web/20181107111203/https://www.cv-foundation.org/openaccess/content_cvpr_2016/papers/Gatys_Image_Style_Transfer_CVPR_2016_paper.pdf>.
Andrew Brock et al., "Neural Photo Editing With Introspective Adversarial Networks", arXiv:1609.07093v3 [cs.LG] Feb. 6, 2017 <https://arxiv.org/pdf/1609.07093.pdf>.
Ryota Natsume et al.,"RSGAN Face Swapping and Editing using", arXiv:1804.03447v2 [cs.CV] Apr. 18, 2018 <https://arxiv.org/pdf/1804.03447.pdf>.
Iryna Korshunova et al., "Fast Face-swap Using Convolutional Neural Networks", arXiv:1611.09577v2 [cs.CV] Jul. 27, 2017 <https://arxiv.org/pdf/1611.09577.pdf>.

\* cited by examiner

APPARATUS AND METHOD FOR EDITING DATA AND PROGRAM

BACKGROUND

1. Technical Field

The disclosure herein relates to apparatuses and methods for editing data, and a program.

2. Description of the Related Art

Generative models for generating data such as images, sounds and texts from intermediate representations (for example, noises or the like) and conditional information (for example, class information or the like) as inputs are known. As such generative models, class-conditional GANs (Generative Adversarial Networks), which are one type of GANs, are known.

According to the class-conditional GANs, however, flexible editing cannot be performed, for example, changing an intermediate representation of a partial image area in an image or the conditional information, modifying the intermediate representation or the conditional information at respective phases in image generation or the like to edit only that image area.

SUMMARY

In light of the above, the present disclosure proposes a flexible data editing scheme to change and modify an intermediate representation or conditional information for a portion of to-be-edited data.

One aspect of the present disclosure relates to a data editing apparatus, comprising: one or more memories; and one or more processors configured to: receive a change indication to change at least a first data area of first data; generate second data by using one or more generative models and an intermediate representation for the first data area; and replace the first data area of the first data with the second data to generate third data.

BRIEF DESCRIPTION OF THE DRAWINGS

Other objects and further features of the present disclosure will be apparent from the following detailed description when read in conjunction with the accompanying drawings, in which.

DETAILED DESCRIPTION

Figure 1:
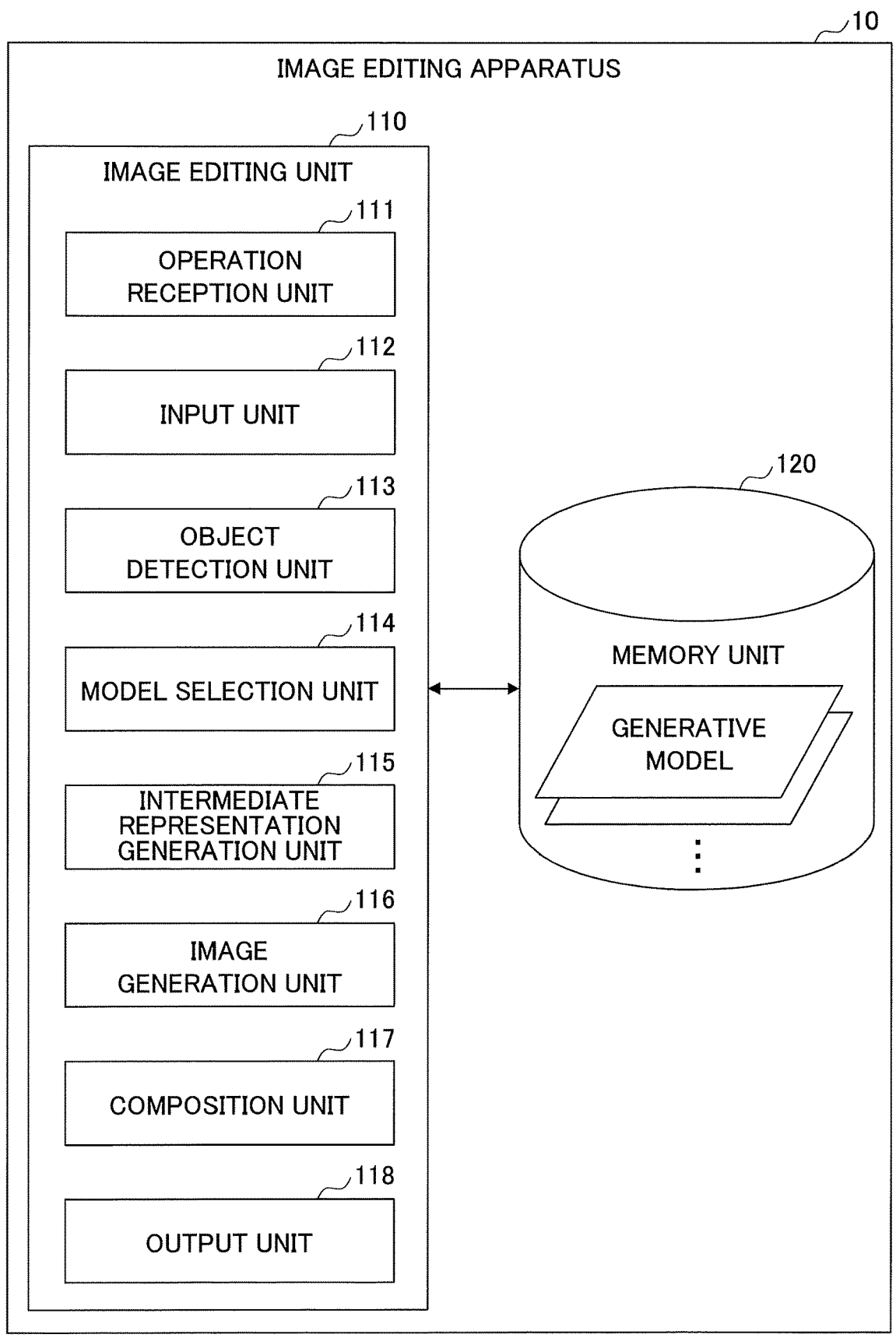
FIG. 1 is a drawing for illustrating one exemplary general arrangement of an image editing apparatus according to one embodiment of the present disclosure.

Embodiments of the present disclosure are described in detail below with reference to the drawings. The same or like reference numerals may be attached to components having substantially the same functionalities and/or components throughout the specification and the drawings, and descriptions thereof may not be repeated.

In embodiments of the present disclosure, as one example, to-be-edited data is focused on an image, and an image editing apparatus 10 is disclosed for editing a partial image area in the image through user's change operation of intermediate representations and/or conditional information and/or modification of the intermediate representations and/or the conditional information at respective phases in image generation. Note that the intermediate representation and the conditional information may be also referred to as "conditional variables".

The embodiments of the present disclosure are not limited to the case of the to-be-edited data being an image and can be analogously applied to cases where various types of data such as sounds or texts are edited.

Here, the intermediate representation is a conditional variable that is input to a generative model and may be also referred to as a "noise" or a "latent variable" depending on the context. Throughout the specification, it is referred to as an "intermediate representation Z".

Also, the conditional information may indicate any state, condition, class or the like for to-be-edited data. In the case where the to-be-edited data is an image, for example, the conditional information may include class information or the like indicative of a class into which pixels in the image are classified. For example, the class may indicate an object type, a classification, a category or the like represented by the pixels in the image. Also in the case where the to-be-edited data is sounds, texts or the like, for example, the conditional information may be an encoding result obtained by encoding sounds or texts at an encoder. Alternatively, the conditional information may be a classification or the like as to whether the sounds come from a male or female or whether the sounds are high or low.

In the embodiments of the present disclosure, the class information is described as one instance of the conditional information and is represented as "class information C". Also, the intermediate representation is represented as "intermediate representation Z".

Also in an embodiment of the present disclosure, a generative model implemented as a neural network such as GANs is used for image generation. Also, it is assumed that this neural network has an architecture, where the incoming intermediate representation Z is iteratively transformed to enhance the resolution gradually, as in those of CNNs (Convolutional Neural Networks). However, the generative model is not limited to what may be implemented in neural networks. Any generative model can be used if it is modeled as an architecture where the intermediate representation Z is transformed into a form having a spatial resolution in at least one of respective phases. As one example of such a generative model, models for generating images in such a manner to enhance the resolution gradually may be available.

The image editing apparatus 10 according to one embodiment of the present disclosure may be implemented with a PC (Personal Computer) or the like, for example, but the present disclosure is not limited to it. The image editing apparatus 10 may be implemented with a smartphone, a tablet terminal or the like, for example.

The image editing apparatus 10 according to one embodiment of the present disclosure can flexibly edit a partial image area in an image by: (1) allowing the intermediate representation Z and the class information C, which serve as conditional variables for a generative model, to be spatially changed in a free and continuous manner; and (2) allowing the conditional variables to be modified at respective phases in image generation. Note that the respective phases in image generation may refer to respective layers in a neural network if the generative model is implemented with the neural network, for example.

Accordingly, for an image including pictures of various objects, an object class for a portion of the image can be changed (for example, changing a dog into a cat, changing a dog into a lion and so on). Also, in addition to changing the class of a whole object, for example, only an image of a portion of an object, such as dog's ears, may be edited, or an editing degree of an image may be continuously changed (for example, changing an object into an intermediate class between a dog and a cat). In this fashion, according to the image editing apparatus 10 of the embodiments of the present disclosure, flexible and extensive variations of image editing can be achieved. Note that to-be-edited images are not limited to certain formats and any type of images such as paintings, illustrations, pictures, computer graphics (CG) or the like are available.

[General Arrangement]

First, a general arrangement of the image editing apparatus 10 according to one embodiment of the present disclosure is described with reference to FIG. 1. FIG. 1 is a drawing for illustrating one exemplary general arrangement of the image editing apparatus 10 according to one embodiment of the present disclosure.

As illustrated in FIG. 1, the image editing apparatus 10 according to one embodiment of the present disclosure has an image editing unit 110 and a memory unit 120. The image editing unit 110 performs operations (image editing operations) to edit a partial image area in an image by changing or modifying a conditional variable. Also, the memory unit 120 stores a generative model (trained generative model) trained with images including objects of different classes, for example. For example, the memory unit 120 may store a plurality of generative models, such as a generative model trained with human images, a generative model trained with dogs' images, a generative model trained with human images and dogs' images. In this fashion, the plurality of generative models trained with images including various classes of objects are stored in the memory unit 120 beforehand. Note that to-be-edited images or others together with the generative models may be also stored in the memory unit 120, for example.

The image editing unit 110 has an operation reception unit 111, an input unit 112, an object detection unit 113, a model selection unit 114, an intermediate representation generation unit 115, an image generation unit 116, a composition unit 117 and an output unit 118.

The operation reception unit 111 receives user's various operations (for example, an indication operation to indicate which image area is to be changed for the class information C, a setting operation to set the changed class information C or the like).

The input unit 112 inputs to-be-edited images. The image input by the input unit 112 is referred to as an "input image" hereinafter. In other words, the input image is the to-be-edited image.

The object detection unit 113 detects positions and classes of one or more objects in an input image in accordance with an existing object detection technique. Here, the object position is detected as a bounding box for the object. Also, the class information C for the object is obtained by detecting the object class.

The model selection unit 114 selects a generative model suitable for an object selected by a user for editing among generative models stored in the memory unit 120.

The intermediate representation generation unit 115 generates the intermediate representation Z for an image area (which may be also referred to as an "image patch" or simply a "patch") in the bounding box for the object selected by the user for editing.

The image generation unit 116 uses the changed class information C and the changed intermediate representation Z to generate an image (in other words, an image having the same size as an image patch for the to-be-edited object) in accordance with the generative model selected by the model selection unit 114. The image generated in accordance with the generative model may be also referred to as an "edited image patch".

The composition unit 117 replaces a relevant image patch portion in the input image with the edited image patch generated by the image generation unit 116 to generate a composite image. The composite image may be referred to as an "edited input image".

The output unit 118 outputs the edited input image generated by the composite unit 117. Here, the output unit 118 may output the edited input image to any output destination. For example, the output unit 118 may output (store) the edited input image in the memory unit 120, output (display) the edited input image on a display device such as a display, or output (send) the edited input image to other devices connected via networks.

[Image Editing Operation]

Figure 2:
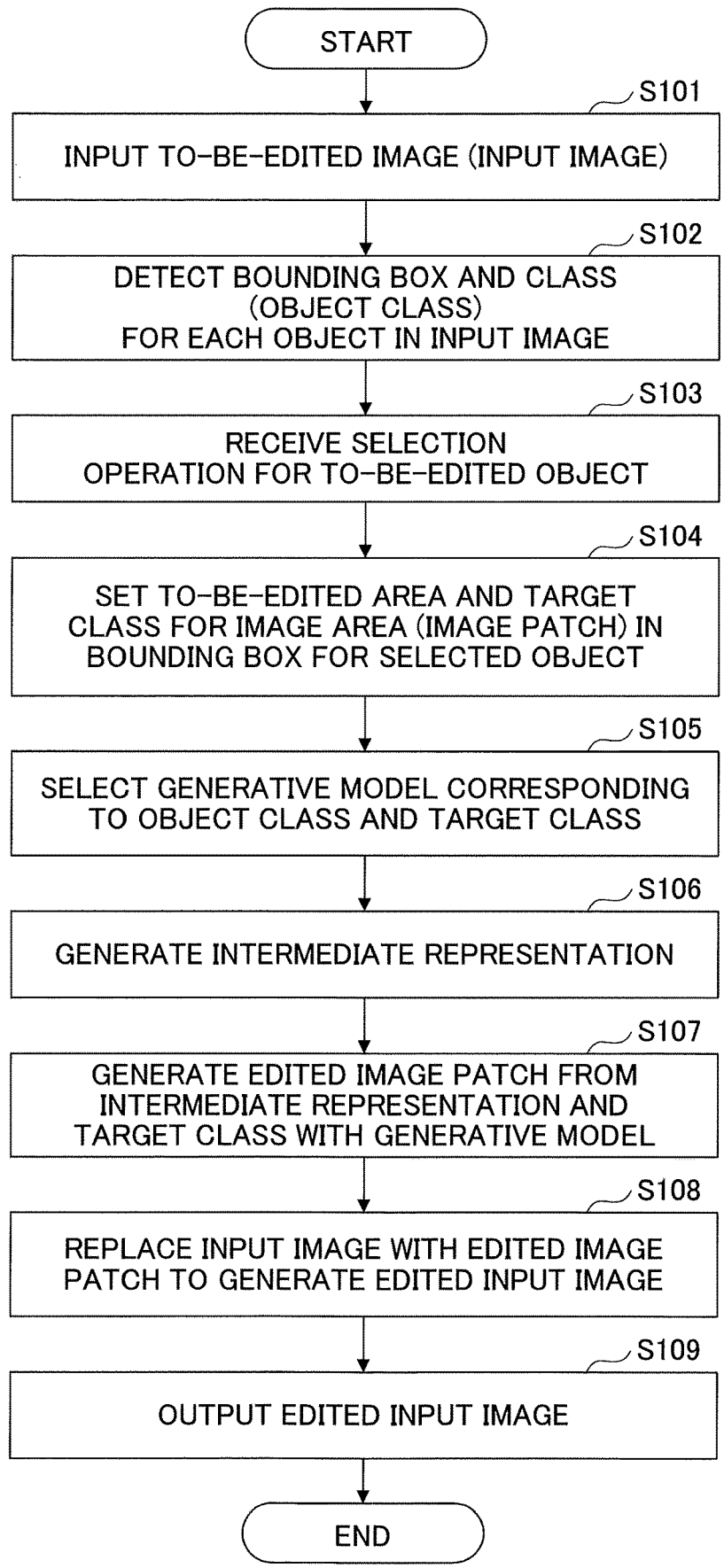
FIG. 2 is a flowchart for illustrating one exemplary image editing operation according to one embodiment of the present disclosure.

Next, an image editing operation according to one embodiment of the present disclosure is described with reference to FIG. 2. FIG. 2 is a flowchart for illustrating one exemplary image editing operation according to one embodiment of the present disclosure.

At step S101, the input unit 112 inputs a to-be-edited image. For example, when a user indicates a to-be-edited image and the operation reception unit 112 receives the indication, the input unit 112 may input the image of interest. A source location of the input image by the input unit 112 may be at a local storage (for example, the memory unit 120) in the image editing apparatus 10 or at a network drive, a cloud storage or the like.

At step S102, the object detection unit 113 detects positions and classes of one or more objects in the input image. The class of an object detected by the object detection unit 113 may be also referred to as an "object class" hereinafter.

Figure 3:
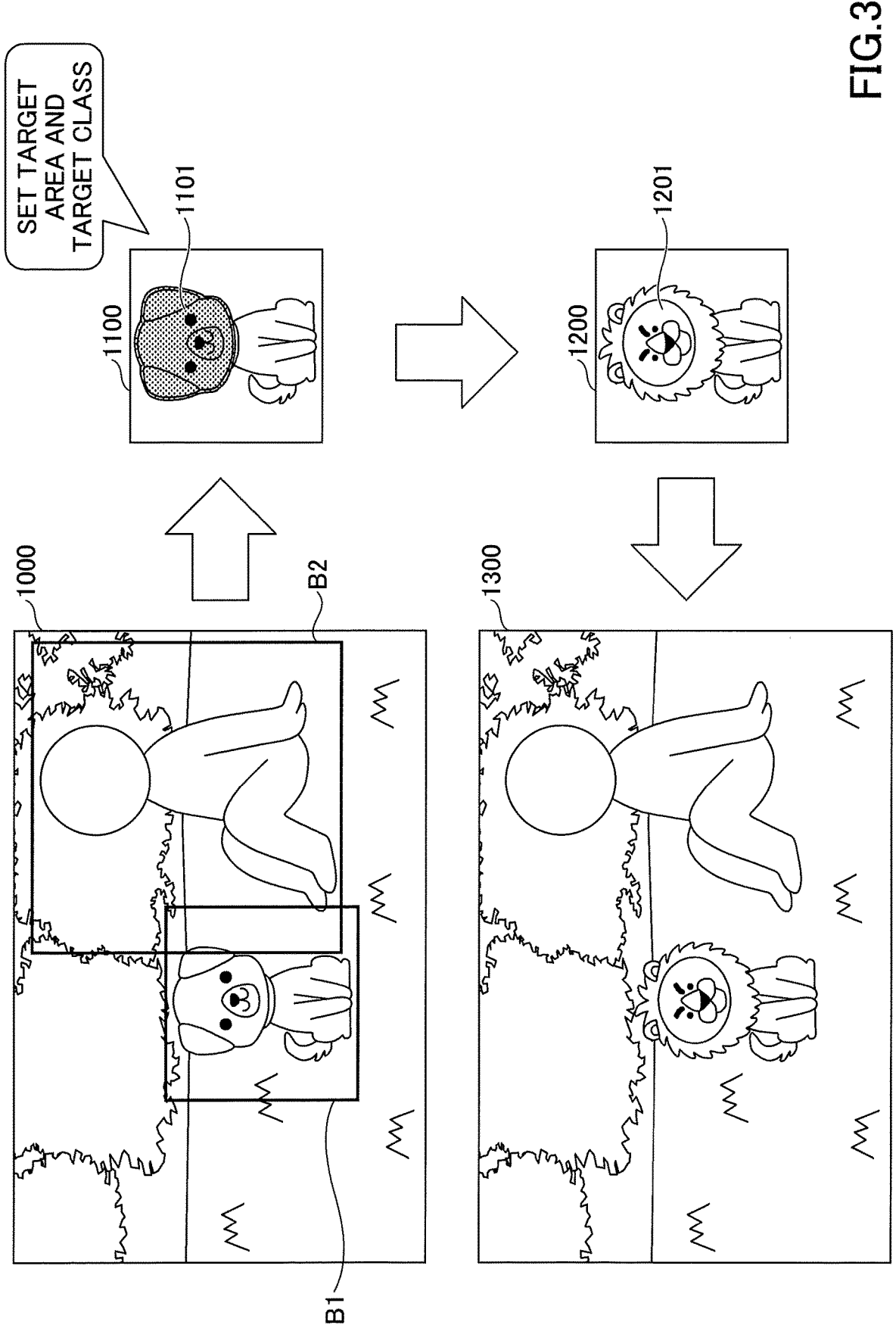
FIG. 3 is a drawing for illustrating one exemplary image editing flow.

For example, if the input unit 112 inputs the input image 1000 as illustrated in FIG. 3, the object detection unit 113 detects the positions and the object classes of objects (a person and a dog) in the input image 1000. As a result, for example, the bounding box B1 and the object class "dog" together with the bounding box B2 and the object class "person" are detected. In this fashion, the class information C indicative of an object class of the object is obtained for each object. Note that the class information C may be obtained as a class map for indicating into which classes respective pixels in the image area (image patch) in the bounding box are classified, for example. Here, the class map is information on a data structure having the same resolution as the image patch. However, determination as to which classes are present as the object classes, which formats are used to represent the object classes, or the like may be made depending on an object detector serving as an implementation of the object detection unit 113.

In FIG. 3, the case of the bounding boxes being detected as the object positions is illustrated. However, the present disclosure is not limited to it, and any area (any rectangular area, any circular area, any polygonal area, any area defined with boundaries of the object or the like) for surrounding the objects may be detected, for example. In this case, the area corresponds to the image patch. Also, the area does not necessarily surround the whole object, and a portion of the object may be protruded from the area. Furthermore, the image patch is not necessarily a portion of the input image 1000, and the image patch may be just equal to the input image 1000.

Also at the above step S102, the class information C is not necessarily detected, and only the bounding box (or any area surrounding the object or the like) may be detected. In addition, the object position and class may not be necessarily detected by the object detection unit 113, and the user may indicate at least one of the object position and class in the input image 1000. In this case, the operation reception unit 111 may receive the user's indication of at least one of the object position and class.

At step S103, the operation reception unit 111 receives a selection operation to select a to-be-edited object among the objects detected at the above step S102 from the user. In the following description, it is assumed that the selection operation to select the object (dog) corresponding to the bounding box in the input image 1000 as illustrated in FIG. 3 has been received as the to-be-edited object. Note that step S103 may be omitted in the case of the single object being detected at the above step S102, the case of all the objects detected at the above step S102 being automatically selected for editing, and so on.

At step S104, the operation reception unit 111 receives a setup operation to set a to-be-edited area (which may be also referred to as a "target area") and its target class for an image area (image patch) in the bounding box for the object selected at the above step S103. Note that the target class is a destination class of the object class for the target area.

In the example as illustrated in FIG. 3, the user operates to set the target area 1101 for the image patch 1100 in the bounding box B1 by painting it with the color corresponding to the target class, for example. However, the target area and the target class may be set in different manners, and the name of the target class or the like may be directly indicated or selected to indicate the target class, for example. Also, the target area may be set not only by freehand painting but also by indicating or selecting a part such as "ears" or a "nose".

When the target area and the target class are set, the changed class information C is generated from the class information of the to-be-edited object. It is assumed that the changed class information C is information on a data structure having the same resolution as the image patch of the object. For example, if the pre-changed class information C is also a class map, one or more ones corresponding to the target area in values forming the class map represented by the pre-changed class information C are changed into values corresponding to the target class in the changed class information C. However, the class information C may be appropriately resized at inputting the changed class information C to the generative model, and accordingly the changed class information C may not have the same resolution as the image patch of the object.

Here, the user may set into which classes respective pixels are classified as well as their ratios as the target class. For example, for a certain pixel, the user may set the target class "lion 100%" or the target class "lion 60% and Persian cat 40%". In this fashion, the user can generate a class map, which is formed of continuous values, as the changed class information C. Note that the pre-changed class information C may be a class map formed of continuous or discrete values.

In this fashion, according to the embodiment of the present disclosure, the user can operate the class information C for the image patch 1100 spatially in a free (namely, the class information C can be changed for any area of an object in an image) and continuous manner.

At step S105, the model selection unit 114 selects a generative model corresponding to the object class and the target class for the object selected at the above step S103 from the memory unit 120.

For example, if the object class is "Shiba dog" and the target class for the target area (such as ears) is "Shepherd dog", the model selection unit 114 may select a generative model trained with dogs' images. Also, for example, if the object class is "dog" and the target class for the target area (such as a face) is "lion", the model selection unit 114 may select a generative model trained with dogs' images and lions' images. The model selection unit 114 may select a generative model corresponding to only either the object class or the target class from the memory unit 120.

In this fashion, the model selection unit 114 may select a generative model suitable for editing the image patch of the object corresponding to at least one of the object class and the target class (namely, a trained generative model that can generate images at a high accuracy by changing the object class into the target class).

Also, the model selection unit 114 may select a plurality of generative models from the memory unit 120 or present the user with these generative models as candidates to finally select one or more generative models indicated by the user among the candidates. Also, when presenting the user with the multiple generative model candidates, the model selection unit 114 may provide some scores for these candidates (for example, a measure or the like to indicate an accuracy of image generation whose object class is changed into the target class) In addition, the model selection unit 114 may select the generative model not only from the memory unit 120 but also from generative models provided from external services such as an API (Application Programming Interface), for example.

If the multiple generative models are selected at the above step S105, the subsequent steps S105 to S108 may be performed on a per-generative model basis, in parallel, or in sequence.

At step S106, the intermediate representation generation unit 115 generates the intermediate representation Z for the image patch of the object selected at the above step S103. Here, the intermediate representation Z may be generated by inputting the image patch to the trained encoder, for example. Besides, for example, the intermediate representation Z may be generated through optimization of an error between the image generated as a result of inputting a random initial value to the generative model selected at the above step S105 and the image patch in accordance with backpropagation. Here, the error may be an error between images, one or both of which are resized to make the image and the image patch be of the same resolution. Alternatively, respective features of the image and the image patch are extracted with any trained neural network, and an error between the extracted features may be used as the error. Particularly, outputs of one or more intermediate layers of a discriminator for GANs may be used as the features.

Note that when the image patch is input to the generative model or the encoder, the resolution of the image patch may be resized to allow the image patch to be input to the generative model or the encoder.

At step S107, the image generation unit 116 inputs the changed class information C and the changed intermediate representation Z to the generative model selected at the above step S105 to generate the edited image patch 1200 as illustrated in FIG. 3, for example. The edited image patch 1200 includes an area 1201 obtained as a result of the target area being edited corresponding to the target class. The edited image patch is generated with the generative model and is obtained as an output of the generative model.

At this time, the image generation unit 116 may resize the changed class information C to be class maps having resolutions corresponding to respective phases in image generation at the generative model, and the resized class maps may be input to the generative model.

Figure 4:
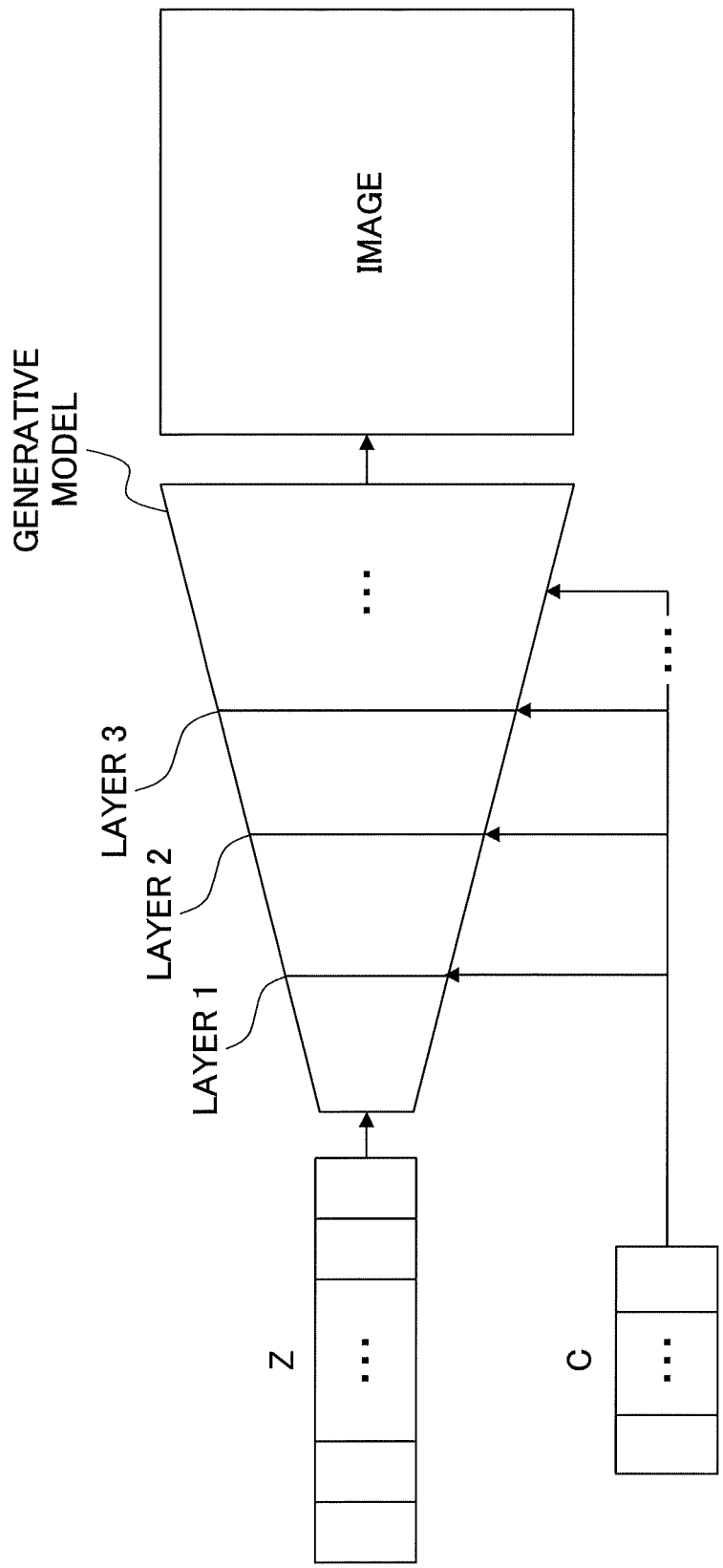
FIG. 4 is a drawing for illustrating one exemplary input of an intermediate representation and class information to a generative model.

As illustrated in FIG. 4, for example, if the generative model implemented as a CNN is formed of layer 1, layer 2, layer 3 and so on, the image generation unit 116 inputs the intermediate representation Z to the generative model on one hand and on the other hand, resizes the class map represented with the changed class information C to have a resolution for allowing the incoming class map to be accepted to each layer and then inputs the resized class map to the generative model. For example, the number of classes is denoted as $C_N$, and if the dimensional size of acceptable data at inputting the class information to layer 1 is $H_1 \times W_1 \times C_N$, the image generation unit 116 first resizes the resolution of the class map represented by the changed class information C into the dimensional size $H_1 \times W_1$ and then inputs the resized class map to layer 1 of the generative model. Similarly, if the dimensional size of acceptable data for layer 2 is $H_2 \times W_2 \times C_N$, the image generation unit 116 first resizes the resolution of the class map represented by the changed class information C into the dimensional size $H_2 \times W_2$ and inputs the resized class map to the generative model. The similar procedure is performed for other layers (phases).

Although only the class map indicated by the changed class information C is resized in the above embodiment, the present disclosure is not limited to it. For example, the class map indicated by the changed class information C may be changed depending respective phases (layers). Specifically, values in the class map indicated by the changed class information C may be changed (for example, a predetermined multiplier may be multiplied with a value corresponding to a certain pixel). Alternatively, the class map may not be input to the generative model in some phases. Particularly, the class map indicated by the changed class information C may not be input to first several layers (for example, the first layer) based on information on image generation by the generative model. In this fashion, the image generated by the generative model can be flexibly changed at a high degree of freedom.

Also, although the intermediate representation Z is directly input to the generative model in the above embodiment, the present disclosure is not limited to it. For example, the intermediate representation Z may be changed, and then the changed intermediate representation Z may be input to the generative model. Furthermore, for example, if the intermediate representation Z can be input to the generative model at respective phases in image generation, the intermediate representation Z may be changed for each phase or depending on the phases, and the changed intermediate representation Z may be input to the generative model.

When the class map and/or the intermediate representation Z is changed, a specific value may be changed in accordance with user's operation, or the values may be automatically changed by the image generation unit 116. Also, the user may be allowed to set whether specific values are to be changed by user's operation or automatically, for example, through setup information.

Figure 5:
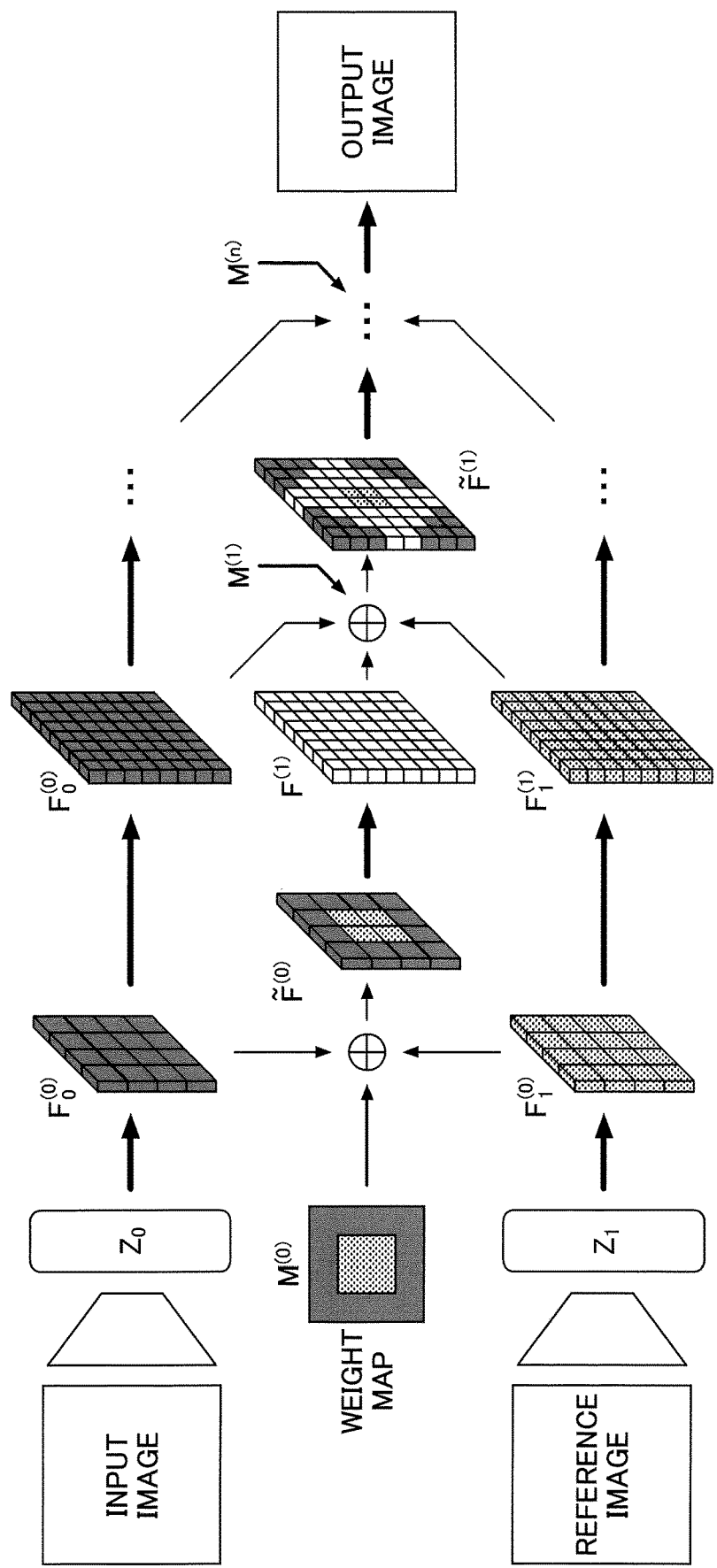
FIG. 5 is a drawing for illustrating one exemplary modification of an intermediate representation at respective phases in a generative model.

As one example of the intermediate representation Z being changed at respective phases of the generative model, one embodiment of intermediate representations of images (which are referred to as "reference images" hereinafter) different from the input image 1000 being used is described with reference to FIG. 5. FIG. 5 is a drawing for illustrating one example of the intermediate representation being changed at respective phases of the generative model. In FIG. 5, as one example, it is assumed that the input image 1000 and the reference image correspond to the resolution of the image patch for the bounding box detected at the above step S102.

The intermediate representation generated from the input image 1000 at the above step S106 and the intermediate representation similarly generated from the reference image are input to the generative model as "intermediate representation $Z_0$" and "intermediate representation $Z_1$", respectively. At this time, as illustrated in FIG. 5, a weight map indicated by the user is used to generate a feature (which is referred to as a "mixture feature" hereinafter) through mixture of the feature (or a portion thereof) of the intermediate representation $Z_1$ with a portion of the feature of the intermediate representation $Z_0$ at respective phases of the generative model.

Specifically, the feature at the n-th phase (n=0, . . . , N) of the generative model for incoming intermediate representation $Z_0$ is denoted as $F_0^{(n)}$, the feature at the n-th phase (n=0, . . . , N) of the generative model for incoming intermediate representation $Z_1$ is denoted as $F_1^{(n)}$, and the weight map at the n-th phase of the generative model is denoted as $M^{(n)}$. Then, the mixture feature may be formulated at the respective phase n as follows, $$\tilde{F}^{(n)} = \lambda^{(n)} \Sigma_{i=1}^{N_{ref}} M_i^{(n)} \circ F_i^{(n)} + (1-\lambda^{(n)}) F_0^{(n)},$$

where $N_{ref}$ is the number of reference images, and $N_{ref}=1$ in the example as illustrated in FIG. 5. The operator "o" is Hadamard product, and $\lambda^{(n)}$ takes the range $0 \leq \lambda^{(n)} \leq 1$ and represents a strength of mixture at the n-th phase. Also, $M_i^{(n)}$ is the weight map and has "1" corresponding to elements of $F_i^{(n)}$ for mixture and "0" corresponding to elements for non-mixture. The mixture feature in the above formula is represented as $\tilde{F}^{(n)}$ in the specification.

As illustrated in FIG. 5, the finally output mixture feature $\tilde{F}^{(n)}$ is the edited image patch 1200 as the output image.

In the example as illustrated in FIG. 5, the single reference image is illustrated, but the number $N_{ref}$ of reference images may be equal to two or more, as understood in the formula. Also, although the mixture feature is generated at each phase n of the generative model in the example illustrated in FIG. 5, the present disclosure is not limited to it. The mixture feature may be generated at only one or more certain phases n. Particularly, the mixture feature may be generated at only several first phases (for example, n=0) of the generative model.

Also, although four features (for example, four features located at (2, 2), (2, 3), (3, 2) and (3, 3)) at the center of 4×4 $F_0^{(0)}$ at the phase n=0 are mixed in the example as illustrated in FIG. 5, for example, determination as to which features are mixed may be made based on the weight map $M_i^{(n)}$. Accordingly, the user can specify the weight map $M_i^{(n)}$ to determine which elements of features are to be mixed at which phase n.

Furthermore, although the features located at the same positions between $F_0^{(n)}$ and $F_1^{(n)}$ at each phase n are mixed in the example as illustrated in FIG. 5, the present disclosure is not limited to it. For example, features located at different positions between $F_0^{(n)}$ and $F_1^{(n)}$ may be mixed. Specifically, for example, the four features at the center of 4×4 $F_0^{(0)}$ at the phase n=0 (for example, the four features located at (2, 2), (2, 3), (3, 2) and (3, 3)) may be mixed with four feature located at upper left positions of $F_1^{(1)}$ (for example, the four features located at (1, 1), (1, 2), (2, 1) and (2, 2)), respectively. In other words, in general, features located at arbitrary (spatial) positions of $F_i^{(n)}$ may be mixed with features located at arbitrary (spatial) positions of $F_1^{(n)}$ at any phase n.

Although the above formula is illustratively presented for mixture of one or more (features of) reference images in the above embodiment, the formula is merely one example, and arbitrary formula can be applied if it serves to mix any data having one or more dimensional resolutions.

At step S108, the composition unit 117 combines the edited image patch 1200 generated at the above step S107 with the image patch 1100 of the input image 1000 (namely, the image patch of the object selected at the above step S103) to generate the edited input image 1300 as illustrated in FIG. 3, for example. Here, the composition unit 117 may extract an area 1201 from the edited image patch 1200 by using the target area 1101 in the image patch 1100 as a mask and combine the area 1201 with the image patch 1100 in the input image 1000 in accordance with an image composition scheme such as Poisson Image Blending to generate the edited input image 1300. In this fashion, occurrence of image artifacts can be avoided at boundaries.

At step S109, the output unit 118 outputs the edited input image 1300 generated at the above step S108. If a plurality of generative models are selected at the above step S105 and a plurality of edited input images are generated at the above step S108, these edited input images may be displayed to enable the user to make selection. In this fashion, the user can obtain desired ones from the multiple edited input images edited by multiple different generative models.

[Hardware Arrangement]

Figure 6:
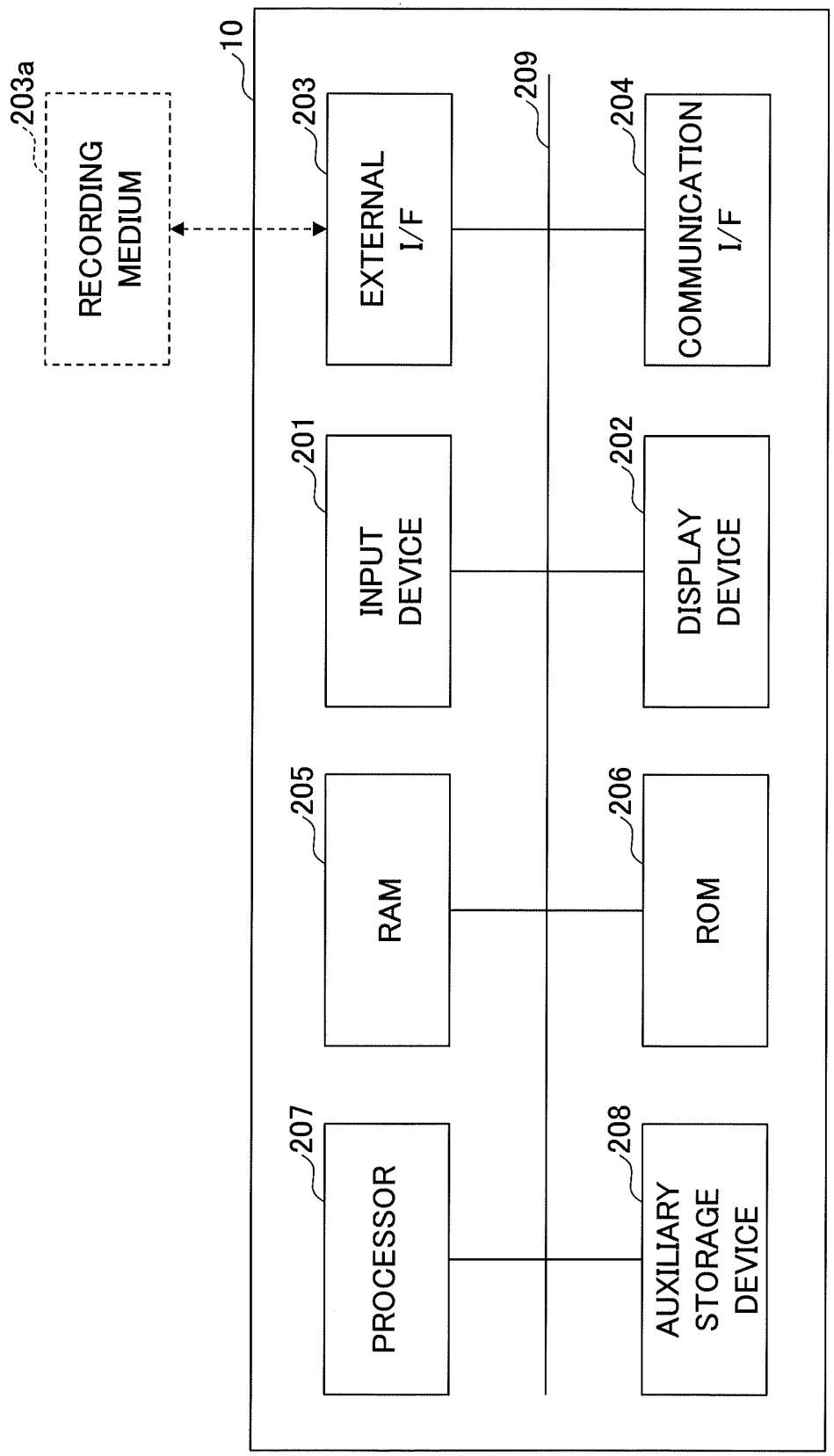
FIG. 6 is a block diagram for illustrating one exemplary hardware arrangement of an image editing apparatus according to one embodiment of the present disclosure.

Next, a hardware arrangement of the image editing apparatus 10 according to an embodiment of the present disclosure is described with reference to FIG. 6. FIG. 6 is a drawing for illustrating one exemplary hardware arrangement of the image editing apparatus 10 according to an embodiment of the present disclosure.

As illustrated in FIG. 6, the image editing apparatus 10 according to the embodiment of the present disclosure has an input device 201, a display device 202, an external I/F 203, a communication I/F 204, a RAM (Random Access Memory) 205, a ROM (Read Only Memory) 206, a processor 207 and an auxiliary storage device 208. The respective hardware items are communicatively coupled to a bus 209.

The input device 201 is a keyboard, a mouse, a touch panel or the like, for example, and is used for a user to input various operations. The display device 202 is a display or the like, for example, and displays various processing results (for example, input images, edited input images and so on) of the image editing apparatus 10. The image editing apparatus 10 may not have at least one of the input device 201 and the display device 202.

The external I/F 203 is an interface to external devices. The external devices may include a recording medium 203a and so on. The image editing apparatus 10 can read or write data from/to the recording medium 203a or others via the external I/F 203. The recording medium 203a may record one or more programs, to-be-edited images or the like to implement the image editing unit 110.

For example, the recording medium 203a may include a flexible disk, a CD (Compact Disc), a DVD (Digital Versatile Disk), a SD (Secure Digital) memory card, a USB (Universal Serial Bus) memory card and so on.

The communication I/F 204 is an interface to connect the image editing apparatus 10 to a communication network. One or more programs, to-be-edited images or the like for implementing the image editing unit 110 may be obtained (downloaded) from a predetermined server apparatus or the like via the communication I/F 204.

The RAM 205 is a volatile semiconductor device for storing programs and data temporarily. The ROM 206 is a non-volatile semiconductor device for storing programs and data even when it has not been powered. For example, the ROM 206 may store configurations regarding an OS (Operating System), configurations regarding the communication network, or the like.

The processor 207 is a CPU (Central Processing Unit), a GPU (Graphics Processing Unit) or the like, for example, and serves as an arithmetic device for reading programs and/or data from the ROM 206, the auxiliary storage device 208 or the like to the RAM 205 to perform operations. The image editing unit 110 is implemented with operations executed by the processor 207 in accordance with the one or more programs stored in the auxiliary storage device 208, for example. The image editing apparatus 10 may have both the CPU and the GPU or only one of the CPU and the GPU as the processor 207. Also, the image editing apparatus 10 may have a semiconductor chip dedicated to a FPGA (Field-Programmable Gate Array) or the like, for example.

The auxiliary storage device 208 is a HDD (Hard Disk Drive), a SSD (Solid State Drive) or the like, for example, and is a non-volatile storage device for storing programs and/or data. The auxiliary storage device 208 may store an OS, various application software items, one or more programs to implement the image editing unit 110, or others, for example. Also, the memory unit 120 may be implemented with the auxiliary storage device 208, for example.

The image editing apparatus 10 according to the embodiment of the present disclosure can implement the above-stated image editing operations by providing the hardware arrangement as illustrated in FIG. 6. Note that the hardware arrangement in FIG. 6 is simply one example and may have any other hardware arrangement. For example, the image editing apparatus 10 may have the multiple processors 207. Also, the image editing apparatus 10 may have the multiple RAMs 205, the multiple ROMs 206, the multiple auxiliary storage devices 208 or the like. Also, for example, the image editing apparatus 10 may be arranged with multiple computers.

As stated above, the image editing apparatus 10 according to the embodiments of the present disclosure can edit an image area, which is a portion of an image, thorough user's manipulation of a conditional variable for the image area and/or user's modification of the conditional variable at respective steps of image generation. At this time, according to the embodiments of the present disclosure, the image editing can be implemented by combining object detection in the image with the manipulation of the conditional variable for an area of a portion of the object as well as by further combining with the modification of the conditional variable at the respective steps of image generation. In this manner, the image editing apparatus 10 according to the embodiments of the present disclosure can perform flexible and various image editing.

In the above embodiments of the present disclosure, the case of a bounding box, an arbitrary area surrounding an object, or others being detected at step S102 in FIG. 2 has been described, but a to-be-edited area in an incoming image may be specified by a user in a freehand manner (for example, by surrounding the area with a circle or a rectangle). In this manner, the incoming image can be edited corresponding to the to-be-edited area and a target class by setting the to-be-edited area and the target class for the specified area. Specifically, an edited image including a Shiba dog in the area can be generated by the user's surrounding the to-be-edited area in the incoming image with a circle and setting the target class "Shiba dog", for example.

Also, according to the embodiments of the present disclosure, operations to set the target class (that is, modification of conditional information) at step S104 in FIG. 2 are received. However, the present disclosure is not limited to it, and modification of the intermediate representation Z may be received, or modification of both the conditional information and the intermediate representation Z may be received. Accordingly, an edited image patch may be generated from the modified conditional information and the (unchanged) intermediate representation Z at step S107 in FIG. 2. Also, the edited image patch may be generated from the (unchanged) conditional information and the modified intermediate representation Z. Also, the edited image patch may be generated from the modified conditional information and the modified intermediate representation Z.

Although still images have been focused on as the to-be-edited images in the above embodiments of the present disclosure, the present disclosure is not limited to the above, and moving images may be used as the to-be-edited images. If the moving images are used as the to-be-edited images, the image editing operation according to the embodiments of the present disclosure may be iteratively applied to respective frame images of the moving images. Also, the embodiments of the present disclosure may be applied to not only image editing but also some tasks such as semantic segmentation, for example.

In addition, as stated above, the to-be-edited data according to the embodiments of the present disclosure is not limited to images. As the to-be-edited data, arbitrary data such as sounds, sentences or 3D objects may be used. Specifically, arbitrary data can be used, as long as the data has a resolution of one or more dimensions (particularly, data having a temporal or spatial resolution). Accordingly, according to the embodiments of the present disclosure, such arbitrary data having a resolution of one or more dimensions is used as the to-be-edited data, and flexible data editing can be implemented through manipulation and modification of an intermediate representation and/or conditional information for a portion of the to-be-edited data.

In the embodiments of the present disclosure, the case of the image editing apparatus 10 being implemented as a single entity has been described, but the image editing apparatus 10 may be implemented with a set of multiple apparatuses. Specifically, at least one of the functional units (the operation reception unit 111, the input unit 112, the object detection unit 113, the model selection unit 114, the intermediate representation generation unit 115, the image generation unit 116, the composition unit 117 and the output unit 118) in the image editing apparatus 10 may be implemented with an apparatus different from the image editing apparatus 10. Likewise, the memory unit 120 may be implemented with an apparatus different from the image editing apparatus 10.

Although specific embodiments of the present disclosure have been described in detail, the present disclosure is not limited to the above-stated individual embodiments. Various addition, modification, replacement and partial deletion can be made without deviating the scope of conceptual idea and spirit of the present invention derived from what is defined in claims and its equivalents. For example, if all of the above-stated embodiments are described with reference to some numerical values or formulae, the numerical values or formulae are simply illustrative, and the present disclosure is not limited to the above. Also, the order of operations in the embodiments is simply illustrative, and the present disclosure is not limited to the above.

The present application claims benefits of priority of Japanese Patent Application No. 2018-215020 filed on Nov. 15, 2018, the whole contents of which are incorporated into the present application.

What is claimed is:

1. A data editing apparatus, comprising:
one or more memories; and
one or more processors configured to:
receive a change indication to change a first portion of first data, the change indication being specified by a user, and the first data including the first portion and a second portion;
select a first neural network from a plurality of neural networks based on the change indication, each of the plurality of neural networks being a generative model;
generate second data by inputting an intermediate representation for at least the first portion of the first data into the first neural network; and
generate third data by synthesizing the second data and the second portion of the first data,
wherein the intermediate representation is generated, using a second neural network, based on at least the first portion of the first data and not based on the second portion of the first data, the intermediate representation being at least one of noise or latent variable input into the generative model,
wherein the first portion of the first data is specified by at least one of
(i) the user specifying or selecting a part included in the first data,
(ii) the user painting the first portion with a predetermined color, and
(iii) the user surrounding the first portion with a line, and
wherein the first data, the first portion of the first data, the second portion of the first data, the second data, and the third data are the same type of data.

2. The data editing apparatus as claimed in claim 1, wherein the one or more processors are configured to generate the second data by inputting conditional information and the intermediate representation into the first neural network, the conditional information being generated based on the change indication.

3. The data editing apparatus as claimed in claim 2, wherein the conditional information includes information of at least two target classes.

4. The data editing apparatus as claimed in claim 2, wherein the conditional information is different from conditional information of the first portion of the first data.

5. The data editing apparatus as claimed in claim 1, wherein the first neural network generates the second data gradually, and the one or more processors are configured to change at least one of the intermediate representation or conditional information for each phase or depending on phases and input the changed intermediate representation or the changed conditional information into the first neural network to generate the second data.

6. The data editing apparatus as claimed in claim 1, wherein the one or more processors are configured to select the first neural network from the plurality of neural networks based on an object included in the first portion of the first data.

7. The data editing apparatus as claimed in claim 1, wherein the one or more processors are configured to generate the second data by using an intermediate representation for reference data.

8. The data editing apparatus as claimed in claim 1, wherein the first data is at least one of an image, a sound, a sentence, or a 3D object.

9. The data editing apparatus as claimed in claim 1, wherein the one or more processors are configured to modify the intermediate representation based on the change indication and generate the second data by using the modified intermediate representation.

10. The data editing apparatus as claimed in claim 1, wherein the one or more processors are configured to generate the second data without directly inputting the first portion of the first data into the first neural network.

11. A data editing method, comprising:
receiving, by one or more processors, a change indication to change at least a first portion of first data, the change indication being specified by a user, and the first data including the first portion and a second portion;
selecting, by the one or more processors, a first neural network from a plurality of neural networks based on the change indication, each of the plurality of neural networks being a generative model;
generating, by the one or more processors, second data by inputting an intermediate representation for at least the first portion of the first data into the first neural network; and
generating, by the one or more processors, third data by synthesizing the second data and the second portion of the first data,
wherein the intermediate representation is generated, using a second neural network, based on at least the first portion of the first data and not based on the second portion of the first data, the intermediate representation being at least one of noise or latent variable input into the generative model,
wherein the first portion of the first data is specified by at least one of
(i) the user specifying or selecting a part included in the first data,
(ii) the user painting the first portion with a predetermined color, and
(iii) the user surrounding the first portion with a line, and
wherein the first data, the first portion of the first data, the second portion of the first data, the second data, and the third data are the same type of data.

12. The data editing method as claimed in claim 11, further comprising:
generating, by the one or more processors, the second data by inputting conditional information and the intermediate representation into the first neural network, the conditional information being generated based on the change indication.

13. The data editing method as claimed in claim 12, wherein the intermediate representation and the conditional information are input into the first neural network in order to generate the second data.

14. The data editing method as claimed in claim 12, wherein the conditional information includes information of at least two target classes.

15. The data editing method as claimed in claim 11, wherein the first neural network is selected from the plurality of neural networks based on an object included in the first portion of the first data.

16. The data editing method as claimed in claim 11, wherein the second data is generated by using an intermediate representation for reference data.

17. The data editing method as claimed in claim 11, wherein the plurality of neural networks includes the second neural network.

18. The data editing method as claimed in claim 11, wherein the first data is at least one of an image, a sound, a sentence, or a 3D object.

19. The data editing method as claimed in claim 11, wherein the second data is generated without directly inputting the first portion of the first data into the first neural network.

20. A non-transitory storage medium for storing instructions for causing one or more computers to:
receive a change indication to change at least a first portion of first data, the change indication being specified by a user, and the first data including the first portion and a second portion;
select a first neural network from a plurality of neural networks based on the change indication, each of the plurality of neural networks being a generative model;
generate second data by inputting an intermediate representation for at least the first portion of the first data into the first neural network; and
generate third data by synthesizing the second data and the second portion of the first data,
wherein the intermediate representation is generated, using a second neural network, based on at least the first portion of the first data and not based on the second portion of the first data, the intermediate representation being at least one of noise or latent variable input into the generative model,
wherein the first portion of the first data is specified by at least one of
(i) the user specifying or selecting a part included in the first data,
(ii) the user painting the first portion with a predetermined color, and
(iii) the user surrounding the first portion with a line, and
wherein the first data, the first portion of the first data, the second portion of the first data, the second data, and the third data are the same type of data.

* * * * *